United States Patent
Tsuchiya et al.

(10) Patent No.: US 12,236,561 B2
(45) Date of Patent: Feb. 25, 2025

(54) MIRROR DISTORTION CORRECTION APPARATUS, METHOD, STORAGE MEDIUM, AND VEHICLE CONTROL APPARATUS

(71) Applicant: HONDA MOTOR CO., LTD., Tokyo (JP)

(72) Inventors: Masamitsu Tsuchiya, Wako (JP); Gakuyo Fujimoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 339 days.

(21) Appl. No.: 17/703,937

(22) Filed: Mar. 24, 2022

(65) Prior Publication Data
US 2022/0318960 A1    Oct. 6, 2022

(30) Foreign Application Priority Data

Mar. 31, 2021  (JP) ................. 2021-061592

(51) Int. Cl.
*G06T 5/80* (2024.01)
*G06T 7/70* (2017.01)
*G06V 20/56* (2022.01)

(52) U.S. Cl.
CPC .................. *G06T 5/80* (2024.01); *G06T 7/70* (2017.01); *G06V 20/56* (2022.01); *G06T 2207/30252* (2013.01)

(58) Field of Classification Search
CPC ... G06T 2207/30252; G06T 5/80; G06T 7/70; G06V 20/56
USPC ........................................................ 382/103
See application file for complete search history.

(56) References Cited

U.S. PATENT DOCUMENTS

| | | | |
|---|---|---|---|
| 9,936,163 B1* | 4/2018 | Lubelsky | H04N 23/698 |
| 10,937,124 B2 | 3/2021 | Kogure | |
| 2010/0134621 A1* | 6/2010 | Namkoong | H04N 7/183 |
| | | | 382/254 |
| 2018/0126903 A1* | 5/2018 | Herrmann | H04N 25/61 |

(Continued)

FOREIGN PATENT DOCUMENTS

| | | |
|---|---|---|
| CN | 110009557 A | 7/2019 |
| JP | 2012-065228 A | 3/2012 |

(Continued)

OTHER PUBLICATIONS

Chinese Office Action for Chinese Patent Application No. 202210284585.9 mailed Jun. 29, 2024 (partially translated).

*Primary Examiner* — Kenny A Cese
(74) *Attorney, Agent, or Firm* — Thomas | Horstemeyer, LLP

(57) ABSTRACT

An image processing apparatus performs external recognition for driving assistance or automated driving of a vehicle based on a captured image obtained from a photographing apparatus capturing an image requiring distortion correction. The image processing apparatus: moves and sets a partial region to be a target of distortion correction processing according to a rule, and applies the distortion correction processing to the set partial region of the captured image to acquire a partial image corrected in distortion; detects a road mirror around the vehicle; and changes the rule so that a partial region corresponding to a predetermined direction of the vehicle is preferentially set as a target of the distortion correction processing when a road mirror is detected.

15 Claims, 10 Drawing Sheets

(56) References Cited

U.S. PATENT DOCUMENTS

| | | | |
|---|---|---|---|
| 2018/0268692 A1* | 9/2018 | Takada | G08G 1/04 |
| 2019/0197660 A1 | 6/2019 | Kogure | |
| 2019/0258251 A1* | 8/2019 | Ditty | G06V 20/58 |
| 2020/0406888 A1 | 12/2020 | Hamai et al. | |
| 2022/0253065 A1* | 8/2022 | Toyoura | G05D 1/024 |

FOREIGN PATENT DOCUMENTS

| | | | | |
|---|---|---|---|---|
| JP | 2021-003906 A | 1/2021 | | |
| JP | 2021-004017 A | 1/2021 | | |
| WO | 2020261724 A1 | 12/2020 | | |
| WO | WO-2021010083 A1 * | 1/2021 | | G05D 1/0219 |

\* cited by examiner

FIG. 2A
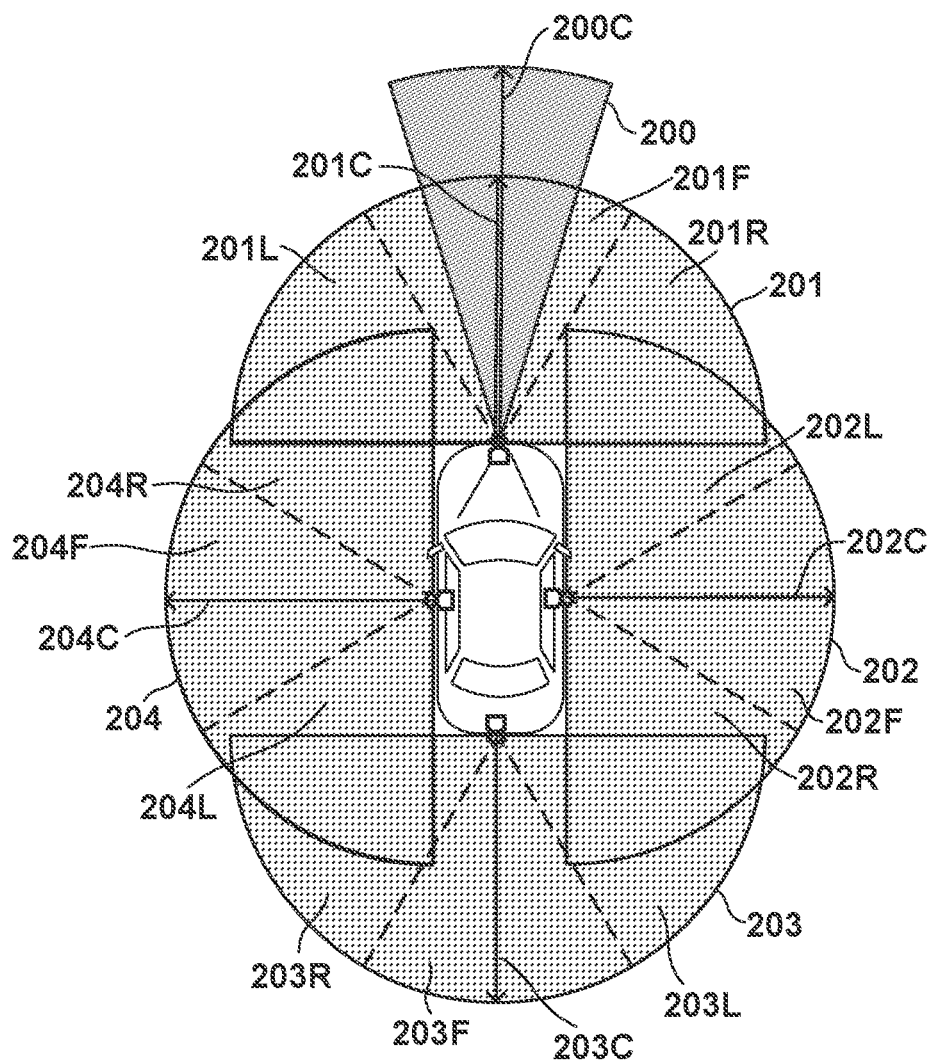
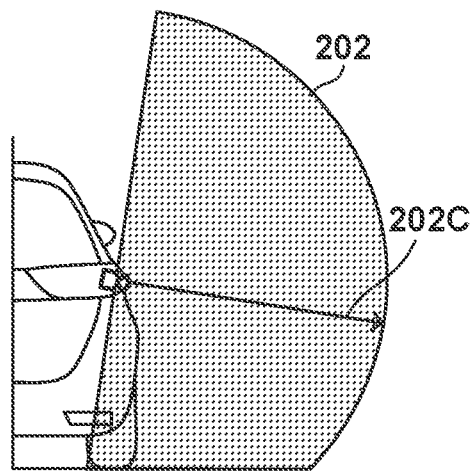
FIG. 2B
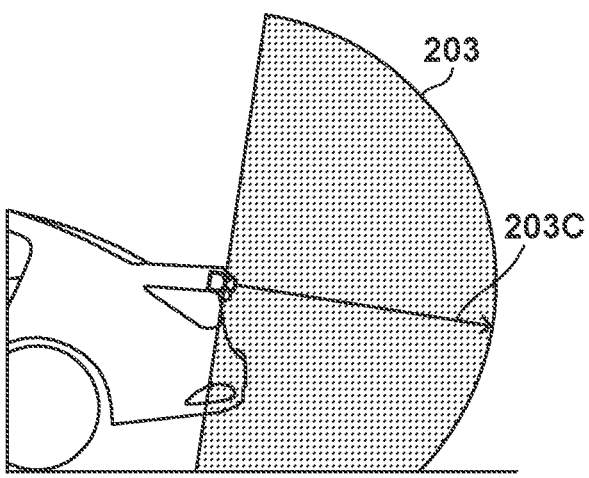
FIG. 2C

FIG. 3
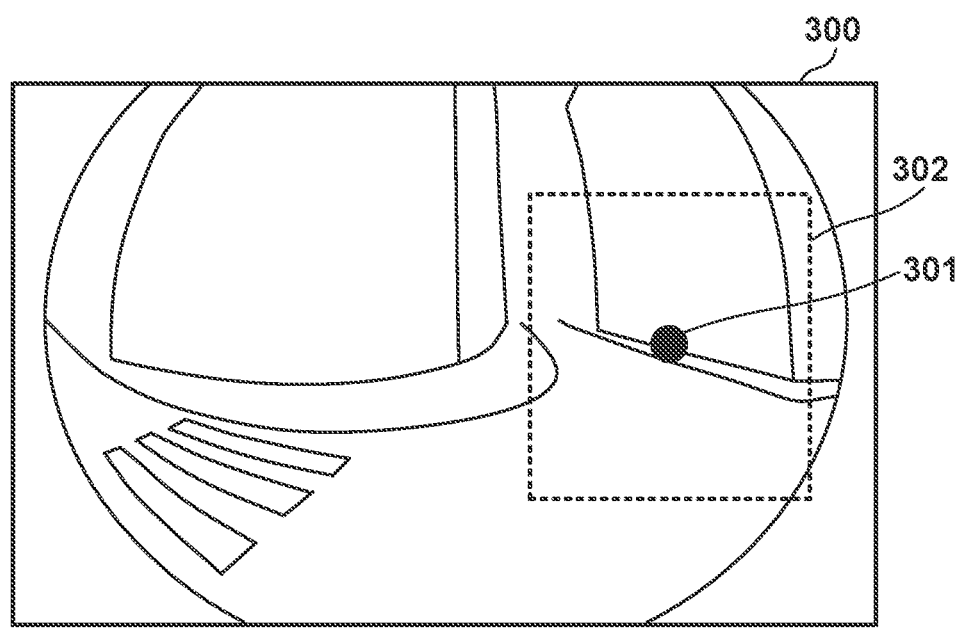
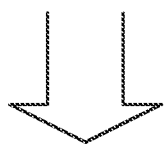
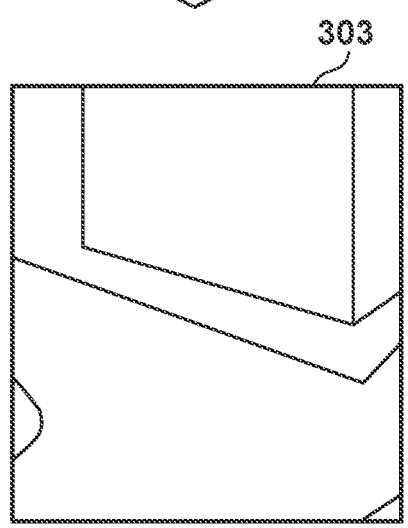

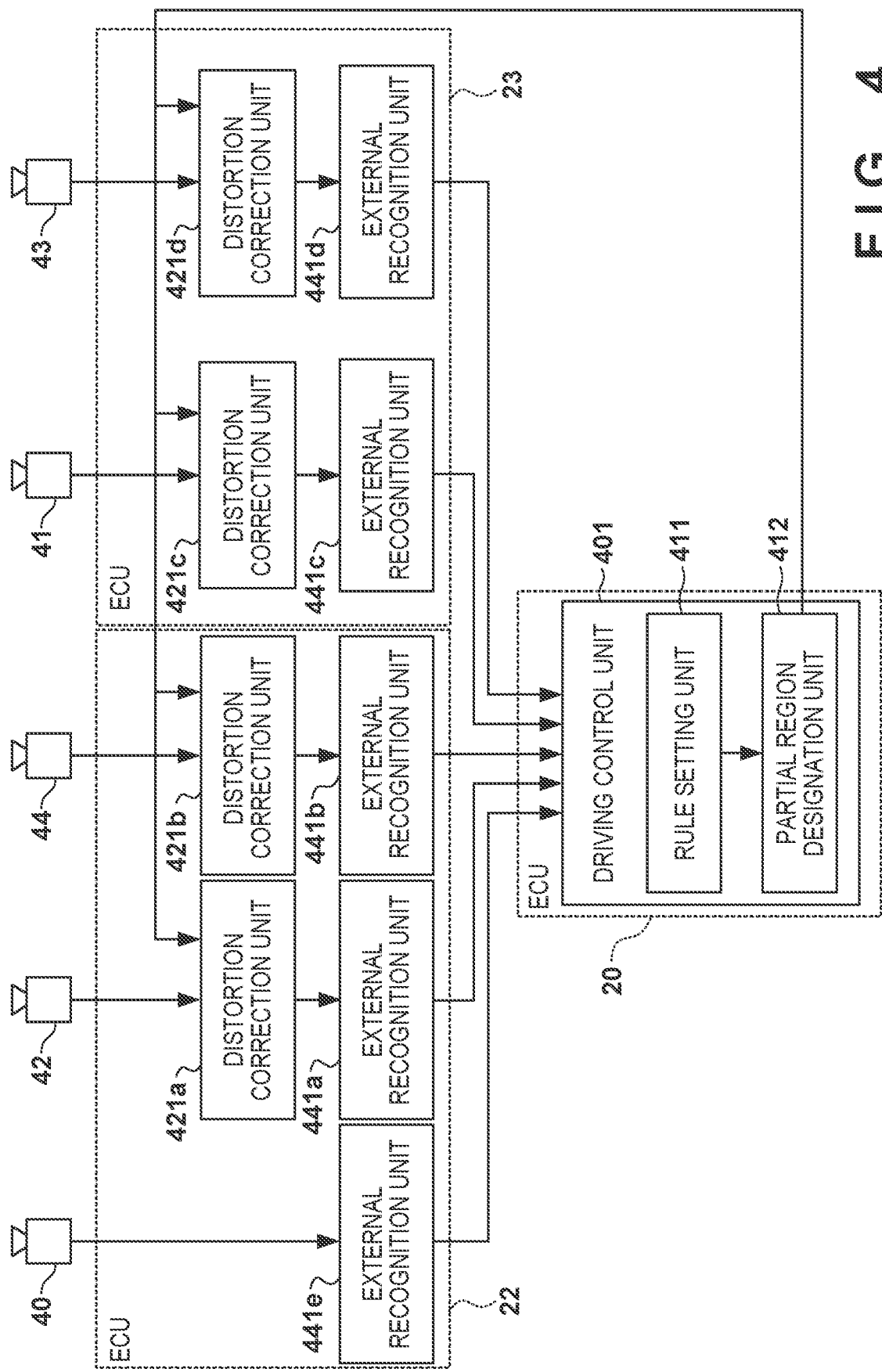

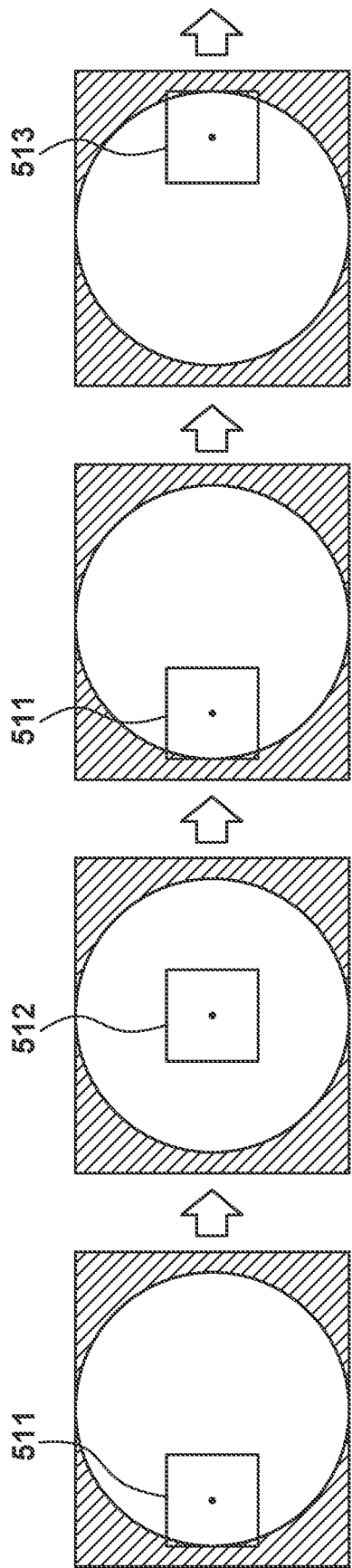
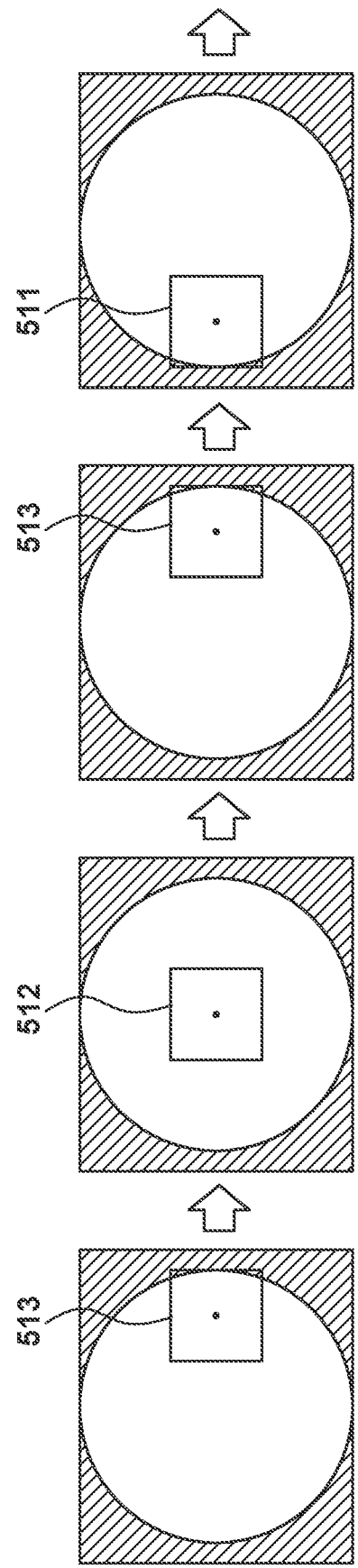
FIG. 9A
FIG. 9B

MIRROR DISTORTION CORRECTION APPARATUS, METHOD, STORAGE MEDIUM, AND VEHICLE CONTROL APPARATUS

CROSS-REFERENCE TO RELATED APPLICATION(S)

This application claims priority to and the benefit of Japanese Patent Application No. 2021-061592 filed on Mar. 31, 2021, the entire disclosure of which is incorporated herein by reference.

BACKGROUND OF THE INVENTION

Field of the Invention

The present invention relates to an image processing technique and a vehicle control technique.

Description of the Related Art

It has been proposed that a fisheye camera is mounted on a vehicle, and a wide range of images captured by the fisheye camera is used for driving assistance. For example, Japanese Patent Laid-Open No. 2021-004017 describes a configuration for providing parking assistance by generating an around view using an image captured by a whole circumference camera (fisheye camera) to display the around view on a monitor. In addition, Japanese Patent Laid-Open No. 2021-003906 describes a system that detects a relative distance and a relative speed with respect to another vehicle, a bicycle, a pedestrian, an obstacle, or the like present around the vehicle using an image of an in-vehicle sensor such as a fisheye camera.

However, the captured image obtained from the fisheye camera generally has large distortion, and cannot be used as it is for advanced recognition processing (for example, recognition processing using AI) for driving assistance control and automatic driving control. Therefore, it is conceivable to perform distortion correction on the image captured by the fisheye camera, and perform recognition processing or the like using the distortion corrected image. For example, it is conceivable to perform the distortion correction processing with the center of the captured image as the center of the distortion correction and use the image after the distortion correction processing for the recognition processing. However, even in the image after the distortion correction processing, the distortion increases in a portion away from the center of the captured image. For this reason, even when an extensive captured image is obtained by the fisheye camera, only a part of the captured image (an image in a predetermined range centered on distortion correction) can be used for the recognition processing, and the extensive captured image cannot be effectively utilized.

SUMMARY OF THE INVENTION

The present invention provides a technique for effectively using an extensive captured image obtained from a fisheye camera for recognition processing for driving assistance or automated driving.

According to one aspect of the present invention, there is provided an image processing apparatus configured to perform external recognition for driving assistance or automated driving of a vehicle based on a captured image obtained from a photographing apparatus configured to capture an image requiring distortion correction, the image processing apparatus comprising: a correction unit configured to move and set a partial region to be a target of distortion correction processing according to a rule, and to apply the distortion correction processing to the set partial region of the captured image to acquire a partial image corrected in distortion; a detection unit configured to detect a road mirror around the vehicle; and a change unit configured to change the rule so that a partial region corresponding to a predetermined direction of the vehicle is preferentially set as a target of the distortion correction processing when a road mirror is detected by the detection unit.

According to another aspect of the present invention, there is provided a vehicle control apparatus comprising: an image processing apparatus configured to perform external recognition for driving assistance or automated driving of a vehicle based on a captured image obtained from a photographing apparatus configured to capture an image requiring distortion correction, the image processing apparatus including: a correction unit configured to move and set a partial region to be a target of distortion correction processing according to a rule, and to apply the distortion correction processing to the set partial region of the captured image to acquire a partial image corrected in distortion, a detection unit configured to detect a road mirror around the vehicle, and a change unit configured to change the rule so that a partial region corresponding to a predetermined direction of the vehicle is preferentially set as a target of the distortion correction processing when a road mirror is detected by the detection unit; a recognition unit configured to recognize a surrounding environment based on a partial image acquired by the correction unit and corrected in distortion; and a control unit configured to perform control for driving assistance or automated driving based on a surrounding environment recognized by the recognition unit.

According to another aspect of the present invention, there is provided an image processing method for performing external recognition for driving assistance or automated driving of a vehicle based on a captured image obtained from a photographing apparatus configured to capture an image requiring distortion correction, the image processing method comprising: moving and setting a partial region to be a target of distortion correction processing according to a rule, and applying the distortion correction processing to the set partial region of the captured image to acquire a partial image corrected in distortion; detecting a road mirror around the vehicle; and changing the rule so that a partial region corresponding to a predetermined direction of the vehicle is preferentially set as a target of the distortion correction processing when a road mirror is detected by the detecting.

According to another aspect of the present invention, there is provided a non-transitory computer-readable storage medium storing a program for causing a computer to execute an image processing method for performing external recognition for driving assistance or automated driving of a vehicle based on a captured image obtained from a photographing apparatus configured to capture an image requiring distortion correction, the method comprising: moving and setting a partial region to be a target of distortion correction processing according to a rule, and applying the distortion correction processing to the set partial region of the captured image to acquire a partial image corrected in distortion; detecting a road mirror around the vehicle; and changing the rule so that a partial region corresponding to a predetermined direction of the vehicle is preferentially set as a target of the distortion correction processing when a road mirror is detected by the detecting.

Further features of the present invention will become apparent from the following description of exemplary embodiments with reference to the attached drawings.

BRIEF DESCRIPTION OF THE DRAWINGS

FIGS. 2A to 2C are diagrams for illustrating shooting ranges of a standard camera and a fisheye camera;

FIG. 3 is a diagram illustrating distortion correction processing of an image captured by a fisheye camera;

FIG. 4 is a block diagram showing a functional configuration example for surrounding environment recognition using a captured image;

FIGS. 9A and 9B are diagrams illustrating an example of a rule when a partial region corresponding to the left front of the vehicle is prioritized.

DESCRIPTION OF THE EMBODIMENTS

Figure 1:
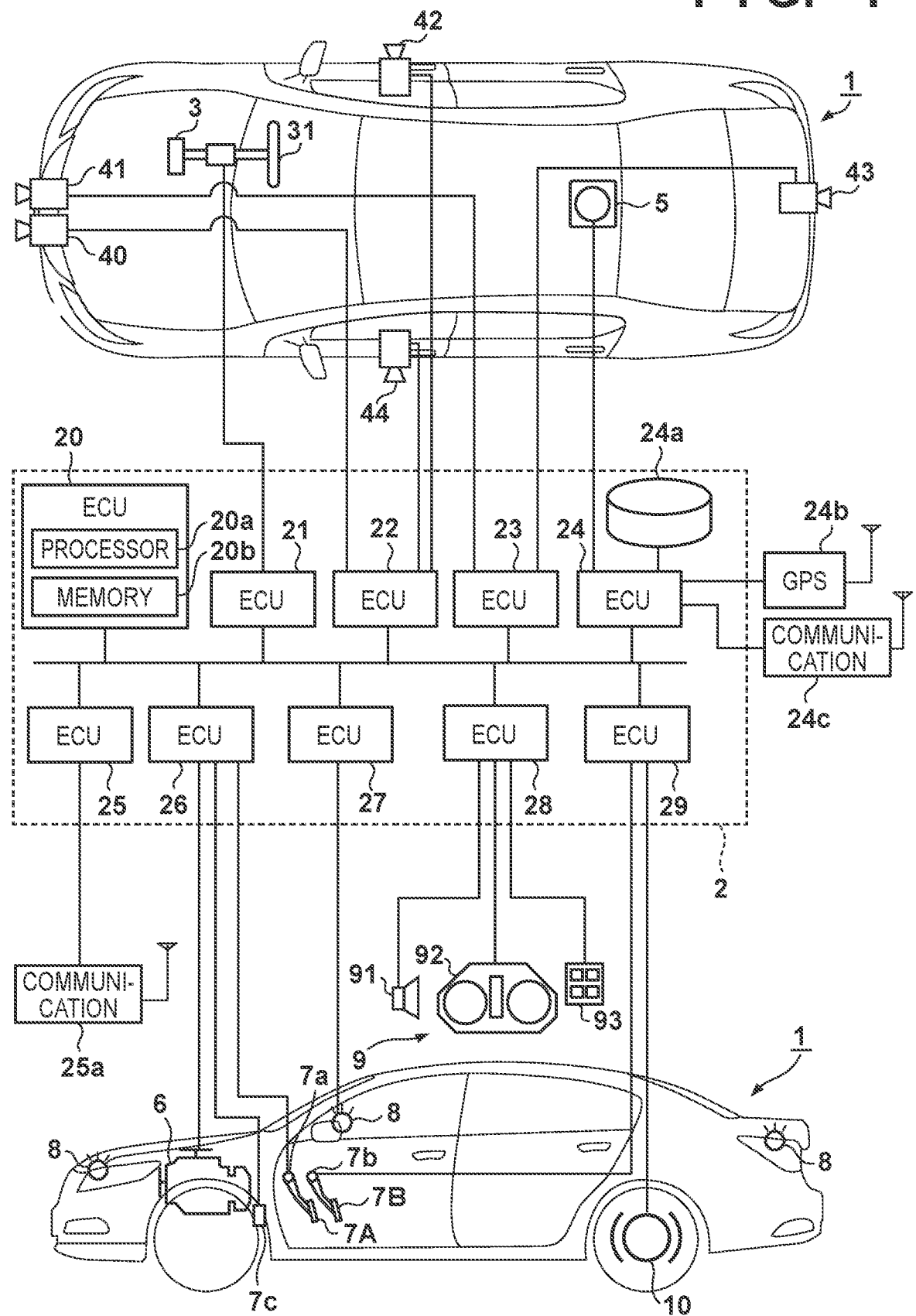
FIG. 1 is a block diagram showing a configuration example of a vehicle according to an embodiment.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

FIG. 1 is a block diagram of a vehicle 1 according to an embodiment of the present invention. In FIG. 1, an outline of a vehicle 1 is shown in a plan view and a side view. The vehicle 1 is, for example, a sedan-type four-wheeled passenger vehicle. The vehicle 1 may be such a four-wheeled vehicle, a two-wheeled vehicle, or another type of vehicle.

The vehicle 1 of the present embodiment is, for example, a parallel hybrid vehicle. In this case, a power plant 6, which is a travel driving unit that outputs driving force for rotating driving wheels of the vehicle 1, can include an internal combustion engine, a motor, and an automatic transmission. The motor can be used as a drive source for accelerating the vehicle 1, and can also be used as a generator at the time of deceleration or the like (regenerative braking).

The vehicle 1 includes a vehicle control apparatus 2 (hereinafter, simply referred to as a control apparatus 2) that controls the vehicle 1. The control apparatus 2 includes a plurality of electronic control units (ECUs) 20 to 29 communicably connected by an in-vehicle network. Each ECU includes a processor (computer) such as a central processing unit (CPU), a memory such as a semiconductor memory, an interface with an external device, and the like. The memory stores programs executed by the processor, data used for processing by the processor, and the like. Each ECU may include a plurality of processors, memories, interfaces, and the like. For example, the ECU 20 includes a processor 20*a* and a memory 20*b*. The processor 20*a* executes a command including a program stored in the memory 20*b*, whereby processing by the ECU 20 is executed. Alternatively, the ECU 20 may include a dedicated integrated circuit such as an application specific integrated circuit (ASIC) for executing processing by the ECU 20. The same applies to other ECUs.

Hereinafter, functions and the like assigned to the respective ECUs 20 to 29 will be described. It should be noted that the number of ECUs and assigned functions can be designed as appropriate and can be subdivided or integrated as compared with the present embodiment.

The ECU 20 executes control related to automated traveling of the vehicle 1. In automated driving, at least any one of the steering and acceleration and deceleration of the vehicle 1 is automatically controlled. The automated traveling by the ECU 20 may include automated traveling that does not require a traveling operation by a driver (which may also be referred to as automated driving) and automated traveling for assisting the traveling operation by the driver (which may also be referred to as driving assistance).

The ECU 21 controls an electric power steering apparatus 3. The electric power steering apparatus 3 includes a mechanism that steers a front wheel according to a driver's driving operation (steering operation) on a steering wheel 31. In addition, the electric power steering apparatus 3 includes a motor that exerts driving force for assisting steering operation and automatically steering the front wheel, a sensor that detects a steering angle, and the like. When the driving state of the vehicle 1 is automated driving, the ECU 21 automatically controls the electric power steering apparatus 3 in response to an instruction from the ECU 20, and controls the traveling direction of the vehicle 1.

The ECUs 22 and 23 control detection units that detect a surrounding situation of the vehicle, and performs information processing of the detection results. The vehicle 1 includes one standard camera 40 and four fisheye cameras 41 to 44 as a detection unit that detects the surrounding situation of the vehicle. The standard camera 40 and the fisheye cameras 42 and 44 are connected to the ECU 22. The fisheye cameras 41 and 43 are connected to the ECU 23. The ECUs 22 and 23 can extract an outline of a target or a lane division line (white line or the like) on a road by analyzing images captured by the standard camera 40 and the fisheye cameras 41 to 44.

The fisheye cameras 41 to 44 are cameras to which fisheye lenses are attached. Hereinafter, the configuration of the fisheye camera 41 will be described. Other fisheye cameras 42 to 44 may have similar configurations. The angle of view of the fisheye camera 41 is wider than the angle of view of the standard camera 40. Therefore, the fisheye camera 41 can capture a wider range than the standard camera 40. The image captured by the fisheye camera 41 has a larger distortion than the image captured by the standard camera 40. Therefore, before analyzing the image captured by the fisheye camera 41, the ECU 23 may perform conversion processing (hereinafter, referred to as "distortion correction processing") for reducing distortion on the image. On the other hand, before analyzing the image captured by the standard camera 40, the ECU 22 does not need to perform the distortion correction processing on the image. As described above, the standard camera 40 is a photographing apparatus that captures an image not to be a target of the distortion correction processing, and the fisheye camera 41 is a photographing apparatus that captures an image to be a target of the distortion correction processing. Instead of the standard camera 40, another photographing apparatus that captures an image not to be a target of the distortion correction processing, such as a camera to which a wide-angle lens or a telephoto lens is attached, may be used.

The standard camera 40 is attached to the front center of the vehicle 1 and captures an image of the surrounding situation ahead of the vehicle 1. The fisheye camera 41 is attached to the front center of the vehicle 1 and captures an image of the surrounding situation ahead of the vehicle 1. In FIG. 1, the standard camera 40 and the fisheye camera 41 are shown as being arranged in the horizontal direction. However, the arrangement of the standard camera 40 and the fisheye camera 41 is not limited to this, and for example, they may be arranged in the vertical direction. In addition, at least one of the standard camera 40 and the fisheye camera 41 may be attached to a roof front portion (for example, the vehicle interior side of the windshield) of the vehicle 1. The fisheye camera 42 is attached to the center of the right side portion of the vehicle 1 and captures an image of the surrounding situation to the right of the vehicle 1. The fisheye camera 43 is attached to the rear center of the vehicle 1 and captures an image of the surrounding situation behind the vehicle 1. The fisheye camera 44 is attached to the center of the left side portion of the vehicle 1 and captures an image of the surrounding situation to the left of the vehicle 1.

The type, number, and mounting position of the camera included in the vehicle 1 are not limited to the above-described examples. In addition, the vehicle 1 may include a light detection and ranging (LiDAR) or a millimeter wave radar as a detection unit for detecting a target around the vehicle 1 and measuring a distance to the target.

The ECU 22 performs control of the standard camera 40 and the fisheye cameras 42 and 44 and information processing of detection results. The ECU 23 performs control of the fisheye cameras 41 and 43 and information processing of detection results. The reliability of the detection result can be improved by dividing the detection unit that detects the surrounding situation of the vehicle into two systems.

The ECU 24 controls a gyro sensor 5, a global positioning system (GPS) sensor 24*b*, and a communication apparatus 24*c*, and performs information processing of detection results or communication results. The gyro sensor 5 detects a rotational motion of the vehicle 1. The detection result of the gyro sensor 5, the wheel speed, and the like enable determination of the course of the vehicle 1. The GPS sensor 24*b* detects the current location of the vehicle 1. The communication apparatus 24*c* performs wireless communication with a server that provides map information and traffic information and acquires these pieces of information. The ECU 24 can access a map information database 24*a* constructed in the memory, and the ECU 24 searches for a route from the current location to a destination and the like. The ECU 24, the map database 24*a*, and the GPS sensor 24*b* constitute what is called a navigation apparatus.

The ECU 25 includes a communication apparatus 25*a* for vehicle-to-vehicle communication. The communication apparatus 25*a* performs wireless communication with other surrounding vehicles to exchange information between the vehicles.

The ECU 26 controls a power plant 6. The power plant 6 is a mechanism that outputs a driving force for rotating driving wheels of the vehicle 1 and includes, for example, an engine and a transmission. For example, the ECU 26 controls the output of the engine according to the driving operation (accelerator operation or acceleration operation) of the driver detected by an operation detection sensor 7*a* provided on an accelerator pedal 7A and switches the gear ratio of the transmission based on information such as the vehicle speed detected by a vehicle speed sensor 7*c* and the like. When the driving state of the vehicle 1 is automated driving, the ECU 26 automatically controls the power plant 6 in response to an instruction from the ECU 20, and controls the acceleration and deceleration of the vehicle 1.

The ECU 27 controls lighting apparatuses (headlights, taillights, and the like) including direction indicators 8 (blinkers). In the example of FIG. 1, the direction indicator 8 is provided in the front part, the door mirror, and the rear part of the vehicle 1.

The ECU 28 controls an input and output apparatus 9. The input and output apparatus 9 outputs information to the driver and accepts an input of information from the driver. An audio output apparatus 91 notifies the driver of information by audio. A display apparatus 92 notifies the driver of information by displaying an image. The display apparatus 92 is arranged on, for example, a front surface of a driver's seat, and constitutes an instrument panel or the like. It should be noted that although the audio and the display have been exemplified here, information notification may also be made by using vibration or light. In addition, information notification may be made by combining some of audio, display, vibration, and light. Furthermore, the combination or the notification form may be changed in accordance with the level (for example, the degree of urgency) of information that should be notified. An input apparatus 93 is a switch group arranged at a position operable by the driver and used to input an instruction to the vehicle 1. The input apparatus 93 may also include an audio input apparatus.

The ECU 29 controls a brake apparatus 10 and a parking brake (not shown). The brake apparatus 10 is, for example, a disc brake apparatus, is provided on each wheel of the vehicle 1, and applies resistance to the rotation of the wheel to decelerate or stop the vehicle 1. The ECU 29 controls working of the brake apparatus 10 in response to the driver's driving operation (brake operation) that has been detected by an operation detection sensor 7*b* provided on a brake pedal 7B, for example. When the driving state of the vehicle 1 is automated driving, the ECU 29 automatically controls the brake apparatus 10 in response to an instruction from the ECU 20, and controls the deceleration and stop of the vehicle 1. The brake apparatus 10 and the parking brake can also work to maintain a stop state of the vehicle 1. In addition, when the transmission of the power plant 6 is provided with a parking lock mechanism, the parking lock mechanism can also work to maintain the stop state of the vehicle 1.

Shooting ranges of the standard camera 40 and the fisheye cameras 41 to 44 will be described with reference to FIGS. 2A to 2C. FIG. 2A shows a horizontal shooting range of each camera, FIG. 2B shows a vertical shooting range of the fisheye camera 42 in the right side portion of the vehicle 1, and FIG. 2C shows a vertical shooting range of the fisheye camera 43 attached to the rear portion of the vehicle 1.

First, a shooting range in a plan view (that is, the horizontal direction of the vehicle 1) of the vehicle 1 will be described with reference to FIG. 2A. The standard camera 40 captures a landscape included in the shooting range 200. A shooting center 200C of the standard camera 40 faces directly in front of the vehicle 1. The horizontal view angle of the standard camera 40 may be less than 90°, and may be, for example, about 45° or about 30°.

The fisheye camera 41 captures a landscape included in the shooting range 201. A shooting center 201C of the fisheye camera 41 faces directly in front of the vehicle 1. The fisheye camera 42 captures a landscape included in the shooting range 202. A shooting center 202C of the fisheye camera 42 faces directly to the right of the vehicle 1. The fisheye camera 43 captures a landscape included in the shooting range 203. A shooting center 203C of the fisheye camera 43 faces directly to the rear of the vehicle 1. The fisheye camera 44 captures a landscape included in the shooting range 204. A shooting center 204C of the fisheye camera 44 faces directly to the left of the vehicle 1. The horizontal view angles of the fisheye cameras 41 to 44 may be, for example, greater than 90°, greater than 150°, greater than 180°, and, for example, about 180°. FIG. 2A shows an example in which the horizontal view angles of the fisheye cameras 41 to 44 are 180°.

The shooting range 201 can be divided into a region 201L diagonally forward to the left of the vehicle 1, a region 201F directly in front of the vehicle 1, and a region 201R diagonally forward to the right of the vehicle 1. The shooting range 202 can be divided into a region 202L diagonally forward to the right of the vehicle 1, a region 202F directly to the right of the vehicle 1, and a region 202R diagonally backward to the right of the vehicle 1. The shooting range 203 can be divided into a region 203L diagonally behind to the right of the vehicle 1, a region 203F directly behind the vehicle 1, and a region 203R diagonally behind to the left of the vehicle 1. The shooting range 204 can be divided into a region 204L diagonally backward to the left of the vehicle 1, a region 204F directly to the left of the vehicle 1, and a region 204R diagonally forward to the left of the vehicle 1. The shooting range 201 may be evenly divided (that is, so that the angle of view of each region is made equal) into three regions 201L, 201F, and 201R. The other shooting ranges 202 to 204 may also be equally divided into three.

Since the standard camera 40 and the fisheye cameras 41 to 44 have the shooting ranges 200 to 204 as described above, the directly in front and the four diagonal directions of the vehicle 1 are included in the shooting ranges of the two separate cameras. Specifically, the direct front of the vehicle 1 is included in both the shooting range 200 of the standard camera 40 and the region 201F of the shooting range 201 of the fisheye camera 41. The diagonally forward to the right of the vehicle 1 is included in both the region 201R of the shooting range 201 of the fisheye camera 41 and the region 202L of the shooting range 202 of the fisheye camera 42. The same applies to the other three diagonal directions of the vehicle 1.

Subsequently, a shooting range in the vertical direction of the vehicle 1 will be described with reference to FIGS. 2B and 2C. FIG. 2B illustrates the shooting range in the vertical direction of the fisheye camera 42, and FIG. 2C illustrates the shooting range in the vertical direction of the fisheye camera 43. The same may apply to the shooting ranges in the vertical direction of the other fisheye cameras 41 and 44.

The vertical view angles of the fisheye cameras 41 to 44 may be, for example, greater than 90°, greater than 150°, greater than 180°, and, for example, about 180°. FIGS. 2B and 2C show an example in which the vertical view angles of the fisheye cameras 41 to 44 are 180°. In addition, the shooting center 202C of the fisheye camera 42 and the shooting center 203C of the fisheye camera 43 are directed downward (toward the ground) from the direction parallel to the ground. Alternatively, the shooting center 203C of the fisheye camera 43 may face a direction parallel to the ground, or may face a direction more upward than parallel to the ground (toward opposite to the ground). In addition, the shooting centers 201C to 204C of the fisheye cameras 41 to 44 may face different directions in the vertical direction.

The distortion correction processing of the images captured by the fisheye cameras 41 to 44 will be described with reference to FIG. 3. The image 300 is an image of a landscape to the right of the vehicle 1 captured by the fisheye camera 43. As shown in FIG. 3, the image 300 has a large distortion particularly in the peripheral portion.

The ECU 22 connected to the fisheye camera 43 performs distortion correction processing on the image 300. Specifically, the ECU 22 sets one point in the image 300 as the correction center point 301. The ECU 22 cuts out a rectangular region 302 centered on the correction center point 301 from the image 300. The ECU 22 generates an image 303 in which the distortion is reduced by performing the distortion correction processing on the region 302. In the distortion correction processing, the closer a position is to the correction center point 301, the more the distortion is reduced, and at a position far from the correction center point 301, the distortion is not reduced or the distortion is increased. Therefore, in some embodiments, the ECU 22 sets the correction center point 301 in a region desired to be focused on in the environment around the vehicle 1, and generates an image of this region with reduced distortion.

Next, a functional configuration for performing the surrounding environment recognition processing using the captured images from the standard camera 40 and the fisheye cameras 41 to 44 will be described. It should be noted that the recognition result of the surrounding environment recognition processing can be used for automated driving control or driving assistance control. FIG. 4 is a block diagram showing a functional configuration example of performing image processing for surrounding environment recognition processing using a captured image according to the present embodiment. Each function shown in FIG. 4 may be implemented by executing a program stored in a memory by one or more processors constituting each of the ECUs 20, 22, and 23, may be implemented by dedicated hardware, or may be implemented by cooperation of them. In addition, it goes without saying that the configuration of the functional block, each functional block is implemented by which ECU, and the like are not limited to the configuration shown in FIG. 4. For example, some or all pieces of the processing by the external recognition units 441a to 441e may be implemented by the driving control unit 401.

Captured images by the standard camera 40 and the left and right fisheye cameras 42 and 44 are supplied to the ECU 22. In the ECU 22, the external recognition unit 441e performs external recognition processing on the captured image from the standard camera 40, and extracts various objects such as lane division lines, road signs, other vehicles, road mirrors (traffic convex mirrors), and human beings. For extraction of various objects in the external recognition unit 441e, for example, determination processing by artificial intelligence (AI) or machine learning can be used. As described above, since the captured image from the standard camera 40 has little distortion, it is not necessary to perform distortion correction before the external recognition unit 441e performs recognition processing.

In the ECU 22, the distortion correction unit 421a performs the distortion correction processing as described above with reference to FIG. 3 on the captured image of the fisheye camera 42. The distortion correction unit 421a performs distortion correction processing on a rectangular region (hereinafter, referred to as a designated partial region) centered on the correction center point designated by the partial region designation unit 412, and outputs the partial image after the distortion correction processing to the external recognition unit 441a. The external recognition unit 441a performs external recognition processing similar to that of the external recognition unit 441e on the partial image corrected in distortion by the distortion correction unit 421a, and extracts various objects and signs.

The fisheye camera 42 can capture a wide range of space, but a captured image to be acquired includes a large distortion, and is not suitable for external recognition processing using AI or the like as it is. Therefore, the captured image from the fisheye camera 42 is subjected to distortion correction processing by the distortion correction unit 421a before being supplied to the external recognition unit 441a. Since performing the external recognition processing using the image removed in distortion by the distortion correction unit 421a, the external recognition unit 441a can accurately extract various objects and signs. In accordance with an instruction from the partial region designation unit 412, the distortion correction unit 421a sequentially moves the correction center (that is, the partial region) for each frame of the video captured by the fisheye camera 42 to perform distortion correction, and outputs the partial image corrected in distortion. As described above, by acquiring a partial image corrected in distortion for a partial region while moving the partial region in an extensive image, as a result, an image without distortion can be obtained for an extensive region in an extensive shooting range. Therefore, it is possible to perform external recognition processing with high accuracy on an image of a wide range of region captured by the fisheye camera 42.

Figure 5A:
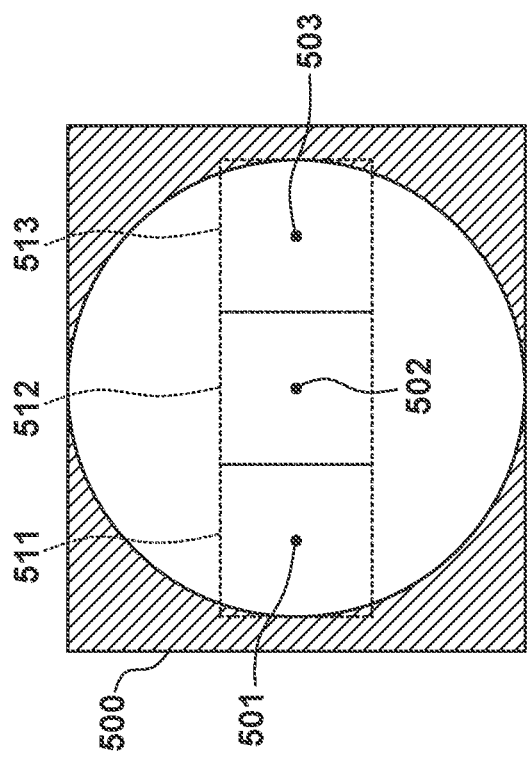
FIGS. 5A and 5B are diagrams illustrating a rule of movement (selection) of a partial region.
Figure 5B:
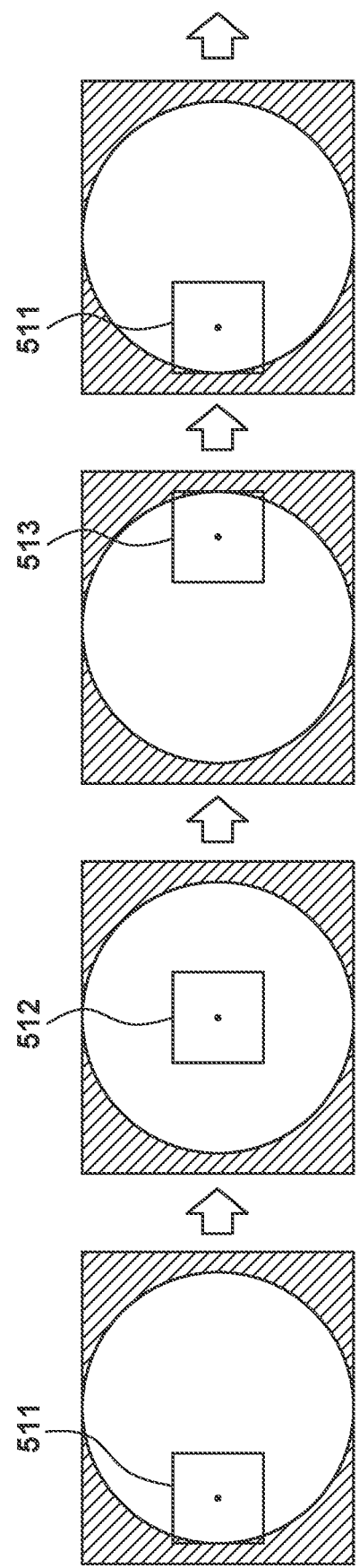

FIGS. 5A and 5B are diagrams illustrating a control example of movement of a partial region at a normal time. The normal time is, for example, a state in which it is determined that there is no direction to which attention should be particularly paid as a result of surrounding environment recognition. As shown in FIG. 5A, in the present embodiment, sequentially selecting any one of the three partial regions 511 to 513 determined by the three correction center points 501 to 503 in the image 500 of the fisheye camera 42 moves the partial region to be corrected in the captured image. Hereinafter, such information indicating the order of selection of the partial region is referred to as a rule. In addition, in the present embodiment, the partial region is set corresponding to the shooting range divided into three as shown in FIG. 2A. For example, in the shooting range of the fisheye camera 41, the ranges of the regions 201L, 201F, and 201R correspond to the partial regions 511, 512, and 513, respectively. Similarly, for example, in the shooting range of the fisheye camera 44, the ranges of the regions 204L, 204F, and 204R correspond to the partial regions 511, 512, and 513, respectively.

It should be noted that the setting of the partial regions is not limited to those illustrated in FIGS. 5A and 5B, and for example, the shooting range may be divided into four or more partial regions in the horizontal direction, may be set so that two or more partial regions exist in the vertical direction, or a part of the partial region may overlap a part of another partial region. In addition, in FIGS. 5A and 5B, for the sake of illustration, partial regions to be subjected to the distortion correction processing in the captured image by the fisheye camera are schematically illustrated. In general, when a rectangular image is desired to be obtained as an image after distortion correction processing, the corresponding partial region in the captured image does not become a rectangle.

The movement of the partial region to be corrected at the normal time is performed so that the three partial regions 511 to 513 are uniformly selected. For example, as shown in FIG. 5B, partial regions to be selected as correction targets such as a partial region 511→a partial region 512→a partial region 513→a partial region 511 are switched for each frame. According to such a rule, the partial region 511 to 513 is selected once every three frames. That is, each partial region is selected as a correction target at an equal frequency, and the partial image after distortion correction is provided to the external recognition processing. It should be noted that which partial region is selected is instructed by the partial region designation unit 412 described below. In addition, in the present embodiment, each partial region is equally selected at the normal time, but the present invention is not limited thereto. In addition, the same rule does not need to be applied to all the captured images from the fisheye cameras 41 to 44, and rules may be applied independently for each. For example, regarding the front fisheye camera 41, a rule at the normal time may be set so that the frequency of selecting the front partial region 512 becomes high, and regarding the other fisheye cameras 42 to 44, a rule at the normal time may be set so that each partial region is equally selected.

Returning to FIG. 4, the distortion correction unit 421b and the external recognition unit 441b perform the distortion correction processing and the external recognition processing as described above on the captured image of the fisheye camera 44. That is, the distortion correction unit 421b performs distortion correction processing on the partial region designated by the partial region designation unit 412 in the image captured by the fisheye camera 44. The external recognition unit 441b performs external recognition processing on the partial image corrected in distortion by the distortion correction unit 421b, and extracts various objects and signs.

In addition, in the ECU 23, the distortion correction unit 421c performs distortion correction processing on the partial region designated by the partial region designation unit 412 in the image obtained by the fisheye camera 41. The external recognition unit 441c performs the above-described external recognition processing on the image corrected by the distortion correction unit 421c. Similarly, the distortion correction unit 421d performs the above-described distortion correction processing on the image obtained by the fisheye camera 43, and the external recognition unit 441d performs the above-described external recognition processing on the image corrected by the distortion correction unit 421d. Hereinafter, the distortion correction units 421a to 421d will be collectively referred to as a distortion correction unit 421, and the external recognition units 441a to 441d will be collectively referred to as an external recognition unit 441.

In the ECU 20, the driving control unit 401 controls driving assistance and automated driving based on the recognition result provided from the external recognition unit 441. The rule setting unit 411 determines a direction to be closely watched based on the recognition result provided from the external recognition unit 441, and changes and sets a rule for selecting a partial region from the captured image by the fisheye camera. The partial region designation unit 412 designates a partial region to be selected as a target of the distortion correction processing to the distortion correction unit 421 according to the rule set by the rule setting unit 411.

As described above, the control apparatus 2 of the present embodiment performs the distortion correction processing while moving the partial region to be corrected in distortion, so that a wide range of images obtained from the fisheye camera can be used for the external recognition processing using AI or the like. On the other hand, as described above, the image to be subjected to the external recognition processing is not the entire one frame of the fisheye camera but a partial image selected from the image of one frame. For example, in the example of the rule illustrated in FIG. 4, the frequency at which each of the three partial regions becomes the target of the external recognition processing is once in three frames. On the other hand, depending on the surrounding environment, a specific direction of the vehicle 1 may need to be closely watched. In such a case, it is preferable to increase the frequency at which the partial region corresponding to the direction to be closely watched becomes the target of the external recognition processing. For example, when a vehicle enters an intersection, a direction to be closely watched changes according to which operation of going straight, turning right, or turning left is performed at that time (it can be determined by a driver's blinker operation or steering wheel operation). Therefore, it is preferable to increase the frequency at which the partial region corresponding to the direction to be closely watched based on such surrounding environment and driving operation becomes the target of the external recognition processing. Therefore, the rule setting unit 411 of the present embodiment changes the rule so as to prioritize a specific partial region according to the surrounding environment, thereby increasing the frequency at which the specific partial region is selected in the distortion correction unit 421. As a result, an image in a direction to be closely watched according to the surrounding environment can be preferentially obtained, so that more appropriate control of driving assistance and automated driving can be achieved.

Generally, the road mirror is installed so as to reflect a place where it is difficult for the driver to check that an object exists. Therefore, in a place where a road mirror is installed, it is necessary to pay more attention to a direction in which the road mirror is directed. Therefore, the rule setting unit 411 of the present embodiment changes the rule indicating the order of movement of the partial region described above so as to increase the frequency at which the partial region corresponding to the direction of the road mirror becomes the target of the distortion correction processing when the presence of the road mirror is detected by the external recognition processing.

Figure 6:
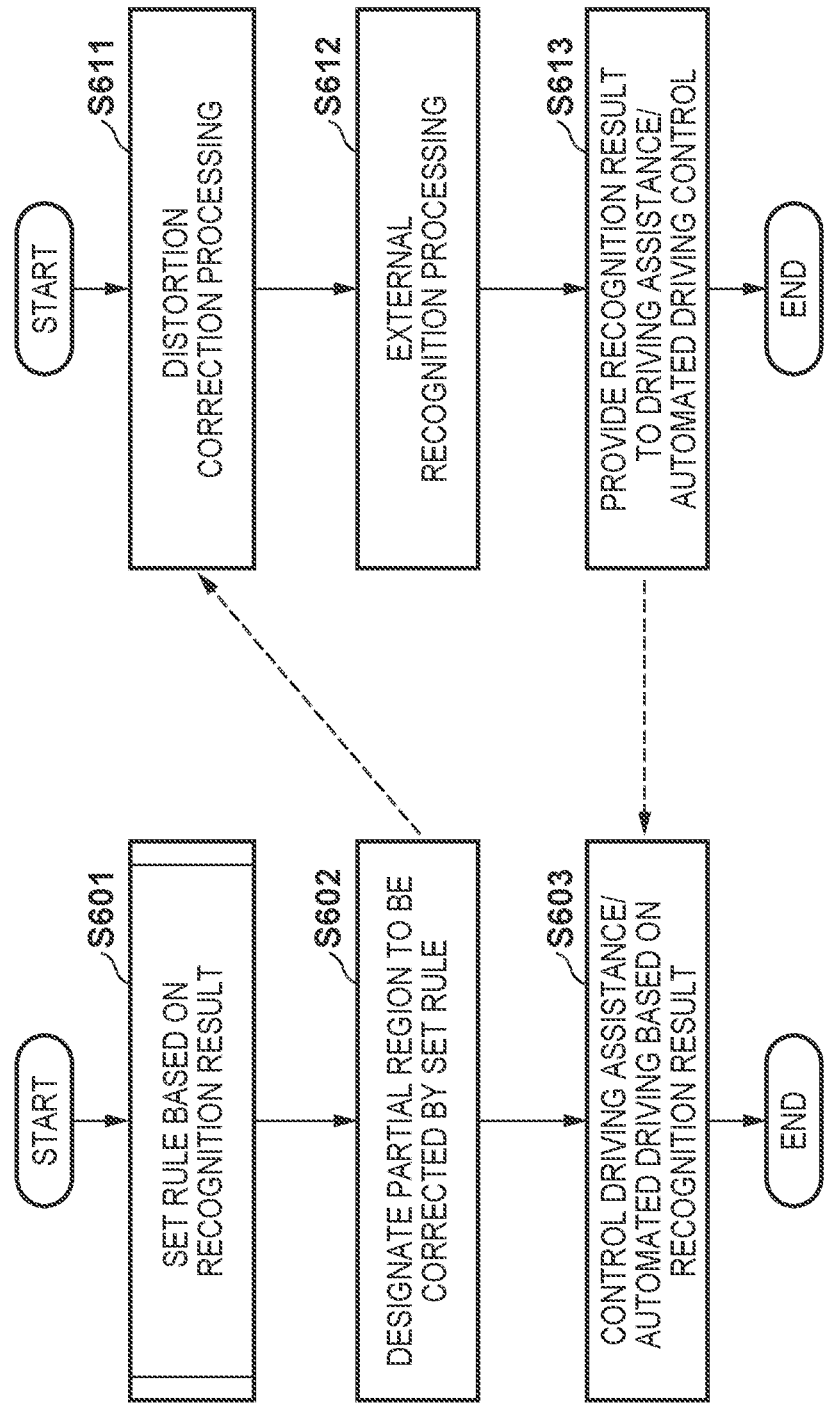
FIG. 6 is a flowchart illustrating a procedure of surrounding environment recognition processing for driving control.

FIG. 6 is a flowchart illustrating a procedure of the external recognition processing according to the present embodiment. In S601, the rule setting unit 411 sets a rule for selecting a partial region based on the external recognition result obtained from the external recognition unit 441 and/or the driving operation (for example, blinker operation/handle operation) by the driver. Details of the processing in S601 will be described below with reference to the flowchart in FIG. 7. In S602, the partial region designation unit 412 sequentially designates the partial region to be corrected according to the rule set in S601 to the distortion correction unit 421.

In S611, the distortion correction unit 421a performs distortion correction processing on the image of the partial region designated by the partial region designation unit 412 in the image acquired from the fisheye camera 42, and obtains a partial image (planar image) in which distortion of the partial region is reduced. In S612, the external recognition unit 441a executes the external recognition processing on the partial image acquired by the distortion correction unit 421a, and extracts various objects such as lane division lines, road signs, other vehicles, road mirrors, and human beings. Here, for the detection of the road mirror, AI may be used, or determination processing by machine learning may be used. In S613, the external recognition unit 441a provides information on the extracted object to the driving control unit 401 for driving assistance control or automated driving control. It should be noted that the processing of the distortion correction unit 421a and the external recognition unit 441a has been described above, and the distortion correction units 421b to 421d and the external recognition units 441b to 441d also perform similar processing.

In S603, the driving control unit 401 recognizes the surrounding environment of the vehicle 1 from the external recognition result obtained from the external recognition unit 441, and controls automated driving or driving assistance based on the recognition result.

Figure 7:
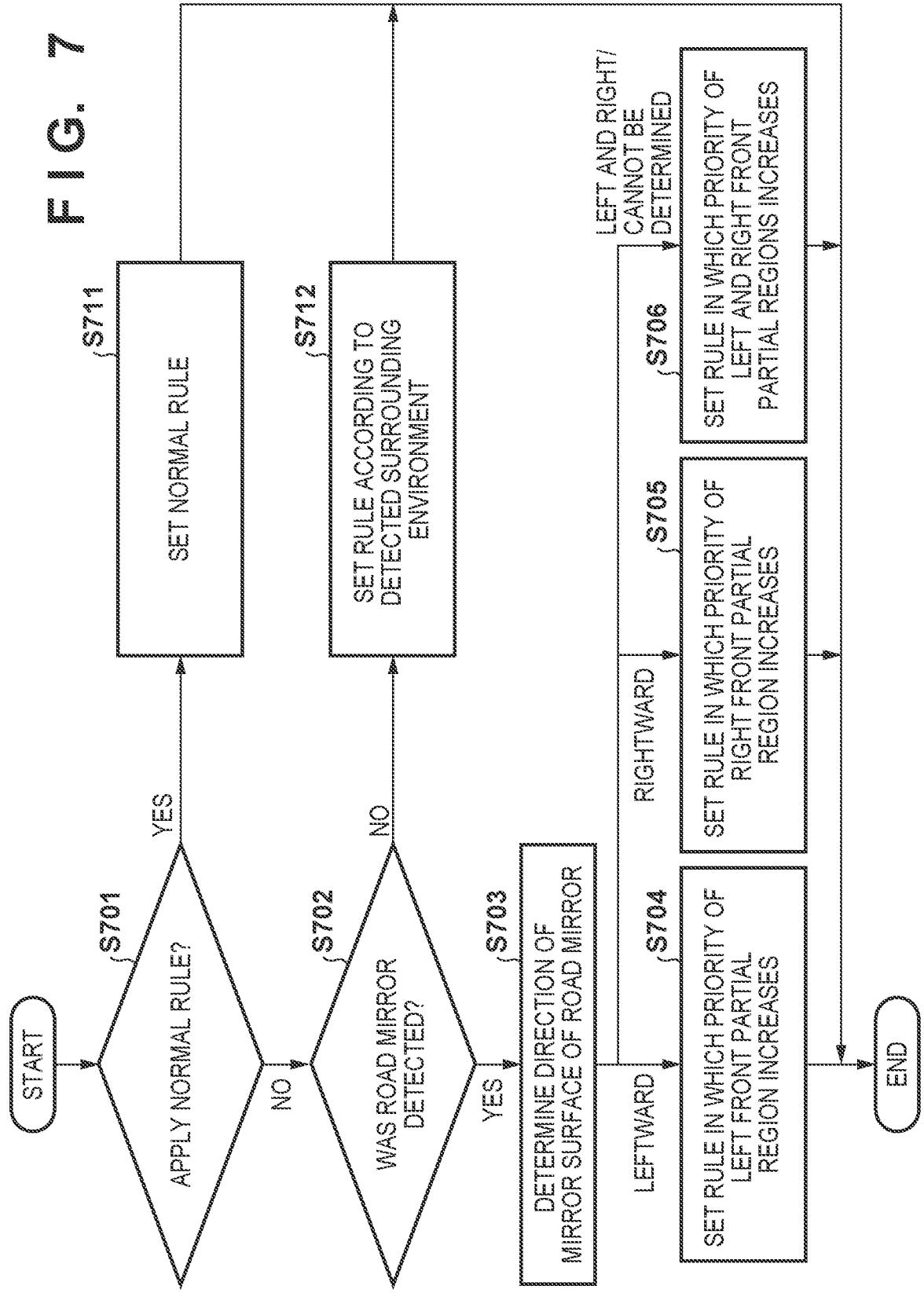
FIG. 7 is a flowchart illustrating processing for setting a rule of movement of a partial region.

FIG. 7 is a flowchart showing processing for setting a rule of movement of a partial region by the rule setting unit 411. In S701, the rule setting unit 411 determines whether or not a normal rule can be set as the movement rule of the partial region based on the external recognition result and the driving operation. A case where the normal rule can be set is a state in which it is determined that there is no particular direction to be closely watched based on the recognition result by the external recognition unit 441, and that each direction around the vehicle has only to be equally checked. On the other hand, when it is determined that it is necessary to more closely watch a specific direction based on the recognition result by the external recognition unit 441, the rule setting unit 411 determines that the normal rule cannot be set. Examples of the situation in which it is necessary to more closely watch a specific direction include a case where an intersection, a road mirror, passing each other in a narrow path, an operation of a blinker lever by a driver, or the like is detected from a recognition result from the external recognition unit 441.

If it is determined in S701 that the normal rule can be set, the processing proceeds to S711. In S711, the rule setting unit 411 sets a normal rule (a rule in which each partial region is selected at an equal frequency) as described in FIG. 5B, for example. As a result, in S602, the partial region designation unit 412 designates the partial region according to the rule described in FIGS. 5A and 5B to each of the distortion correction units 421a to 421d connected to the fisheye cameras 41 to 44.

On the other hand, if it is determined in S701 that the normal rule cannot be set (if it is determined that there is a direction to be closely watched), the process proceeds to S702. In S702, the rule setting unit 411 determines whether or not a road mirror has been extracted in the external recognition processing by the external recognition unit 441. For example, when there is an object whose probability of being a road mirror is a predetermined value or more among the objects detected by the external recognition unit 441, the rule setting unit 411 determines that a road mirror has been detected. If the road mirror is not extracted (NO in S702), it is determined that the rule needs to be changed due to a factor other than the detection of the road mirror. Therefore, the processing proceeds to S712, and the rule setting unit 411 changes the rule based on the surrounding environment and the driving operation detected by the driving control unit 401 based on the external recognition processing. For example, in S712, the rule is changed so that the partial region corresponding to the direction to be closely watched determined based on the surrounding environment recognition result or the driving operation of the driver is preferentially set, that is, the selection frequency of the partial region corresponding to the direction to be closely watched is increased.

Figure 10A:
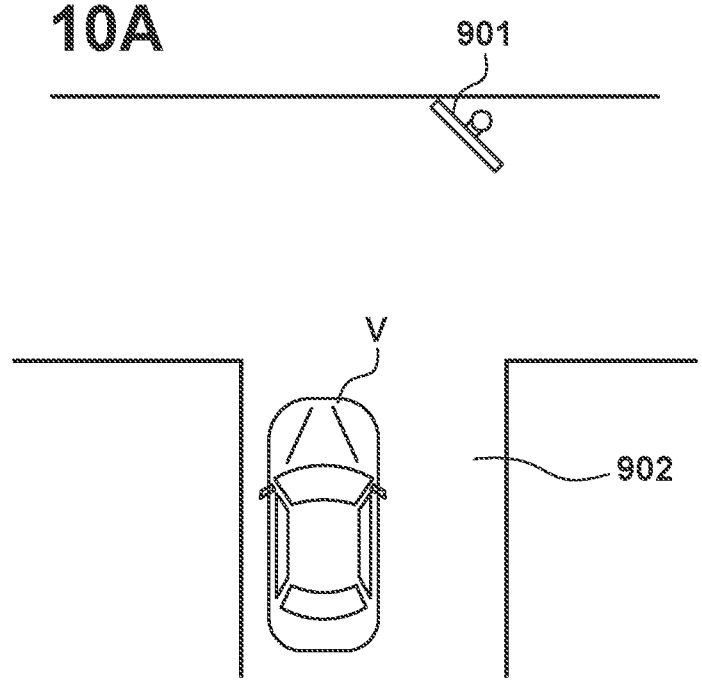
FIGS. 10A and 10B are diagrams illustrating a method for detecting a direction of a road mirror.
Figure 10B:
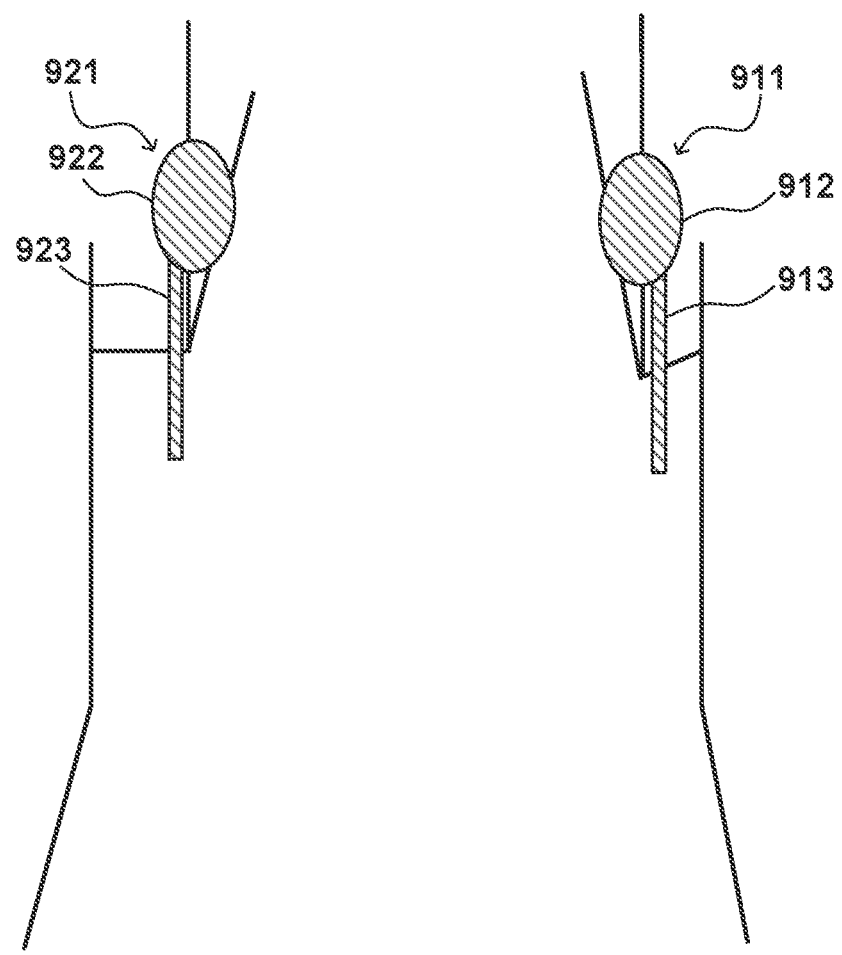

If it is determined that the road mirror has been detected (YES in S702), in S703, the rule setting unit 411 determines the direction of the mirror surface of the road mirror based on the location and the shape of the road mirror extracted by the external recognition processing. For example, (1) the rule setting unit 411 determines the direction of the mirror surface based on the installation position of the road mirror. Specifically, as shown in FIG. 10A, if the installation position of the detected road mirror 901 is on the right side of the center of the lane 902 in which the vehicle 1 travels, it can be determined that the mirror surface faces the left direction with respect to the traveling direction of the vehicle 1. Similarly, if there is a road mirror on the left side of the center of the lane, it can be determined that the mirror surface faces the right direction with respect to the traveling direction of the vehicle. Alternatively, for example, (2) the direction of the mirror surface is determined based on a positional relationship between an outer shape (elliptical shape) representing the mirror surface and a support column supporting the mirror surface. In this method, for example, as shown in FIG. 10B, regarding the road mirror 911, if the support column 913 is on the right side of the center line of the ellipse 912 corresponding to the mirror surface, it can be determined that the mirror surface faces the left side. Similarly, like the road mirror 921, if the support column 923 is on the left side of the center line of the ellipse 922 corresponding to the mirror surface, it can be determined that the mirror surface faces the right side.

Naturally, the method for determining the direction of the road mirror is not limited to the above-described methods (1) and (2), and various determination methods can be used. In addition, a plurality of determination methods may be combined. For example, in each of the determination method of (1) and the determination method of (2), a score indicating the probability that the mirror surface faces left and a score indicating the probability that the mirror surface faces right may be calculated, and a direction with the higher total score may be determined as the direction of the mirror surface. For example, a score is increased for the determined direction as the position of the road mirror is farther from the center of the lane, and a score is increased for the determined direction as the distance between the center of the ellipse corresponding to the mirror surface and the support column increases, and the total score is obtained by summing the scores in each direction. In addition, the number of directions of the road mirror does not need to be one, and when the road mirror is detected on both sides of the road, it is determined that the mirror surface of the road mirror faces the left side and the right side.

It should be noted that it is not necessary to use captured images from all the cameras to determine the road mirror. For example, even if the road mirror is detected in the captured image from the rear fisheye camera 43, the direction to be closely watched is not affected. Thus, only the captured image from the standard camera 40 that captures the front of the vehicle 1 and the captured image from the front fisheye camera 41 may be used for detection of the road mirror.

Figure 8:
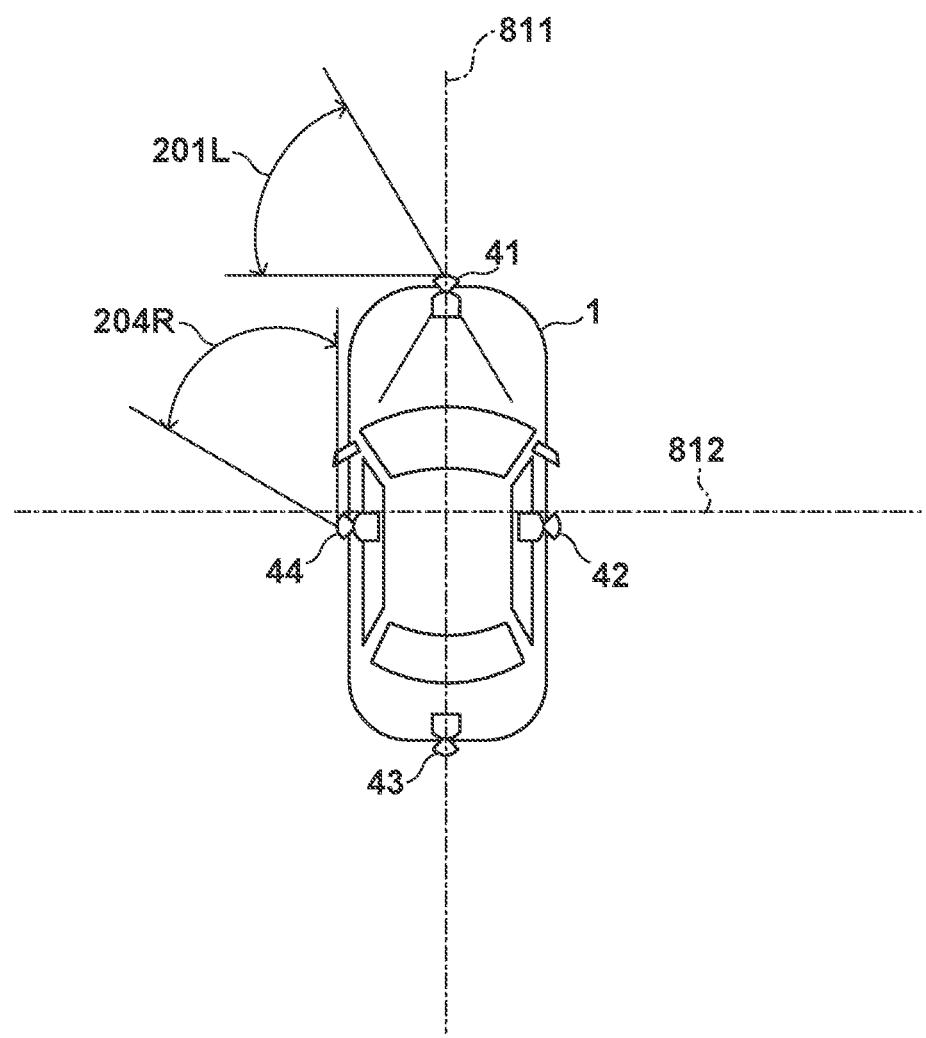
FIG. 8 is a diagram for illustrating left and right front and left and right rear of the vehicle.

In S704 to S706, the rule setting unit 411 changes the rule according to the direction of the road mirror determined in S703. First, if it is determined that the direction of the mirror surface of the road mirror is leftward, in S704, the rule setting unit 411 sets a rule in which priority of a partial region corresponding to the left front of the vehicle 1 is increased. Here, left and right front sides and left and right rear sides of the vehicle 1 according to the present embodiment will be described with reference to FIG. 8. Four zones A to D can be formed by a line 811 that divides the vehicle width of the vehicle 1 into substantially two and a line 812 that divides the vehicle length of the vehicle 1 into substantially two. In the present embodiment, the zone A is defined as right front, the zone B is defined as right rear, the zone C is defined as left rear, and the zone D is defined as left front. Then, for example, a partial region having the largest area including the zone D among a plurality of partial regions set for the shooting range of each fisheye camera is used as a partial region corresponding to the left front. For example, a partial region corresponding to the left front with respect to the fisheye camera 41 is a region 201L, and a partial region corresponding to the left front with respect to the fisheye camera 44 is a region 204R. It should be noted that the definition of the left and right front and the left and right rear is not limited to the above, and for example, the position of the line 812 may be positioned in front of or behind the position at which the vehicle length is equally divided into two.

In S704, the rule setting unit 411 sets a rule of moving a partial region set in the captured image from the front fisheye camera 41 as shown in FIG. 9A, for example. In the example in FIG. 9A, a rule in which partial regions are designated in the order of the partial region 511→the partial region 512→the partial region 511→the partial region 513→ . . . is shown. According to this rule, in the shooting range of the front fisheye camera 41, the frequency at which the partial region 511 (region 201L) corresponding to the left front of the vehicle 1 is the target of the distortion correction processing is two times in four frames. That is, as compared with the frequency (once in 3 frames) in the rule shown in FIGS. 5A and 5B, the frequency at which the partial region 511 is the target of the distortion correction processing is increased. Similarly, also for the fisheye camera 44 on the left side of the vehicle body, the rule is set so that the frequency at which the partial region corresponding to the left front of the vehicle 1 is designated becomes higher. In the captured image by the left fisheye camera 44, the partial region 513 on the right side corresponds to the left front of the vehicle 1. Thus, as shown in FIG. 9B, the rule setting unit 411 sets a rule for the distortion correction unit 421c. Thus, the frequency at which the partial region 513 (region 204R) is the target of the distortion correction processing increases. That is, a partial image corresponding to the front of the vehicle 1 in the captured image by the fisheye camera 44 is preferentially selected. It should be noted that the normal rule is applied to the right fisheye camera 42 and the rear fisheye camera 43 that do not include a partial region contributing to closely watching the left front of the vehicle 1.

In S703, if it is determined that the direction of the mirror surface of the road mirror is rightward, in S705, the rule setting unit 411 sets a rule in which priority of a partial region corresponding to the right front of the vehicle 1 is increased. For example, the rule setting unit 411 sets a rule so that the frequency of designating the partial region corresponding to the right front of the vehicle 1 becomes high to the distortion correction unit 421c for the front fisheye camera 41 and the distortion correction unit 421d for the right fisheye camera 42. As a specific example, the rule shown in FIG. 9B is applied to the front fisheye camera 41 (distortion correction unit 421c), and the rule shown in FIG. 9A is applied to the right fisheye camera 42 (distortion correction unit 421a). In this case, the normal rule can be applied to the left fisheye camera 44 and the rear fisheye camera 43 that do not include a partial region contributing to closely watching the right front of the vehicle 1.

If both the road mirrors facing left and right are detected, or when the direction of the mirror surface cannot be determined although the road mirror is detected, the process proceeds to S706. In S706, the rule setting unit 411 sets a rule using both the rule of closely watching the left front described in S705 and the rule of closely watching the right front described in S706. In this case, in the rule corresponding to the front fisheye camera 41, it is necessary to increase the frequency at which the partial region 511 and the partial region 513 are the target of the distortion correction processing. Thus, for example, the partial region 511→the partial region 513→the partial region 511→the partial region 513→the partial region 512→ . . . may be repeated. In this way, each of the frequency at which the partial region 511 is designated and the frequency at which the partial region 513 is designated is 2 times/5 frames, which is higher than the frequency (1 time/3 frames) designated by the normal rule (FIGS. 5A and 5B). It should be noted that the normal rule is applied to the rear fisheye camera 43 that does not contribute to any of the left front closely watching and the right front closely watching.

According to the embodiment as described above, the partial region of the image captured by the fisheye camera is subjected to distortion correction processing and provided as a partial image. Since the distortion correction processing is performed in a region smaller than the entire image, the provided partial image has distortion removed over the entire region, and highly accurate recognition processing can be achieved. As a result, highly accurate recognition processing can be performed over the entire periphery of the vehicle 1 captured by the fisheye cameras. In addition, since the partial region corresponding to the direction of the installed road mirror is preferentially used for the recognition processing, more rapid recognition of the direction to be closely watched can be achieved, and more effective and appropriate driving assistance control and automated driving control can be achieved. That is, controlling the movement rule according to the detection of the road mirror makes it possible to easily estimate a situation such as a side way requiring closely watching and set a region to be focused on.

It should be noted that the above-described embodiment illustrates a specific example for realizing an idea of identifying a direction to be closely watched based on the detection of a mirror surface direction of a road mirror and increasing priority of a partial region used for peripheral recognition based on the identified direction. Therefore, the definitions of the left and right front sides and the partial regions corresponding thereto, and the rules of selection for applying them to peripheral recognition are not limited to those described in the embodiment. For example, in the above embodiment, the partial region is moved for each frame as a rule for selecting the partial region, but the present invention is not limited thereto. The same partial region may be continuously selected twice or more, and the frequency of selecting the partial region may be increased.

In addition, in the embodiment, a combination of the same partial regions (for example, the partial regions 511 to 513) is used in the normal rule and a rule in the case of closely watching a specific direction, but the present invention is not limited thereto. A combination of partial regions different between the normal rule and a rule in the case of closely watching a specific direction may be used. For example, any partial region corresponding to the direction to be closely watched may be added. Specifically, when the left front of the vehicle 1 is closely watched, a new partial region may be set between the partial region 511 and the partial region 512 in FIG. 9A, and a rule may be set using a group including four partial regions. Alternatively, along with the addition of such a new partial region, an existing partial region (for example, the partial region 513) far from the direction to be closely watched may be deleted from the group. That is, the new partial region and the existing partial region may be interchanged. Furthermore, for example, as shown in FIGS. 2B and 2C, when the shooting center is directed downward, a partial region moved in the vertical direction (upward direction) may be set, as a rule of when the left front of the vehicle 1 is closely watched. Accordingly, it is possible to recognize up to a more far away situation on the left front side of the vehicle 1.

In addition, in the above embodiment, the direction to be closely watched is determined by determining the direction of the road mirror, but the present invention is not limited thereto. In general, in a situation where a road mirror is installed, at least one of the left direction and the right direction is the region to be closely watched. Therefore, if the road mirror is detected (YES in S702), the determination of the direction in S703 may be omitted, and the processing in S706 may be immediately executed with both the left front and the right front of the vehicle 1 as the direction to be closely watched.

It should be noted that by repeating the flowchart in FIG. 7, the rule changed due to the detection of the road mirror is continued until the road mirror is no longer detected. However, the present invention is not limited thereto, and for example, the rule may be returned to the normal rule when the road mirror disappears from the angle of view of the front standard camera 40.

Summary of Embodiment

The above embodiment discloses at least the following embodiments.

1. An image processing apparatus (421, 441) configured to perform external recognition for driving assistance or automated driving of a vehicle based on a captured image obtained from a photographing apparatus (41-44) configured to capture an image requiring distortion correction, the image processing apparatus comprising:

a correction unit (421) configured to move and set a partial region to be a target of distortion correction processing according to a rule, and to apply the distortion correction processing to the set partial region of the captured image to acquire a partial image corrected in distortion;

a detection unit (441, 411) configured to detect a road mirror around the vehicle; and a change unit (411, 412) configured to change the rule so that a partial region corresponding to a predetermined direction of the vehicle is preferentially set as a target of the distortion correction processing when a road mirror is detected by the detection unit.

According to the above embodiment, since the image of the partial region corresponding to the direction to be closely watched corresponding to the detection of the road mirror is preferentially acquired, the object can be detected with high frequency and high accuracy in the direction to be closely watched suitable for the road situation. Therefore, appropriate control can be performed in the driving assistance control and the automated driving control.

2. Also, in the above embodiments, the detection unit detects a road mirror based on an image of a partial region subjected to distortion correction by the correction unit.

According to this embodiment, a captured image obtained from a photographing apparatus that captures an image requiring distortion correction can be used for detection of the road mirror, and the captured image can be effectively used.

3. Also, in the above embodiments, the detection unit detects a road mirror based on an image captured by a photographing apparatus configured to capture an image not to be a target of distortion correction.

According to this embodiment, for example, a captured image from a standard camera can be used for detecting a road mirror, and the road mirror can be detected more frequently.

4. Also, in the above embodiments, the change unit changes the rule so that a frequency at which at least one partial region corresponding to at least one of a left front side and a right front side of the vehicle is selected as a target of the distortion correction processing is increased.

According to this embodiment, in a road situation where a road mirror is detected, it is possible to obtain an image of a region corresponding to the direction to be closely watched with high frequency and to perform more appropriate and rapid driving assistance control and automated driving control.

5. Also, in the above embodiments,
the detection unit detects a direction in which a further detected road mirror reflects, and
the change unit changes the rule so that a frequency at which a partial region corresponding to a direction in which the detected road mirror reflects is selected as a target of the distortion correction processing is increased.

According to this embodiment, it is possible to acquire an image of a region corresponding to a direction in which a road mirror reflects with high frequency and to prevent the other regions from being affected by detection of the road mirror. Therefore, an unnecessary increase in the selection frequency of the partial region can be avoided.

6. Also, in the above embodiments, the detection unit detects a direction in which a road mirror reflects based on whether a position where a road mirror is present is on a left or right side of a center of a lane in which a vehicle travels.

7. Also, in the above embodiments, the detection unit detects a direction in which a road mirror reflects based on a positional relationship between an ellipse corresponding to a mirror surface of a road mirror and a support column configured to support the mirror surface.

According to these embodiments, the direction of the road mirror can be detected relatively easily and accurately.

8. Also, in the above embodiments,
a rule not changed by the change unit is a rule indicating an order of selecting a partial region on a one-by-one basis from a plurality of partial regions, the respective partial regions set in advance and having different positions, and
the change unit changes the rule so that a frequency at which at least one partial region corresponding to the predetermined direction among the plurality of partial regions is selected increases.

According to this embodiment, even if the rule is changed, since a rule is selected from the same set of partial regions, the processing cost can be controlled.

9. Also, in the above embodiments,
a rule not changed by the change unit is a rule indicating an order of selecting a partial region on a one-by-one basis from a plurality of partial regions, the respective partial regions set in advance and having different positions, and a rule changed by the change unit is a rule for selecting a partial region so that a frequency at which at least one partial region corresponding to the predetermined direction is selected increases from a group of partial regions including a partial region corresponding to the predetermined direction and different from any of the plurality of partial regions.

According to this embodiment, the partial region can be set more flexibly to the direction to be closely watched corresponding to the detection of the road mirror.

10. Also, in the above embodiments, a group of the partial regions is configured by adding a partial region corresponding to the predetermined direction and different from any of the plurality of partial regions to the plurality of partial regions, or by substituting any one of the plurality of partial regions with the different partial region.

According to this embodiment, the partial region can be set more flexibly to the direction to be closely watched corresponding to the detection of the road mirror.

11. Also, in the above embodiments, a photographing apparatus configured to capture an image requiring the distortion correction is a fisheye camera.

According to the above embodiment, the extensive shooting range of the fisheye camera can be effectively used, and the number of cameras to be installed, and the image processing system associated therewith, can be reduced. This can contribute to power saving of the vehicle control apparatus.

12. According to the above embodiments,
the image processing apparatus is connected to a plurality of photographing apparatuses, the plurality of photographing apparatuses being arranged to capture an entire periphery of the vehicle and configured to capture an image requiring the distortion correction, and
the change unit changes the rule for a photographing apparatus including the predetermined direction in a shooting range among the plurality of photographing apparatuses.

According to the above embodiment, it is possible to recognize the surrounding environment based on the captured image for the entire periphery of the vehicle, and it is possible to acquire the image of the region corresponding to the direction determined to be closely watched with high frequency when the road mirror is detected.

13. Also, according to the above embodiments, disclosed is a vehicle control apparatus comprising:
an image processing apparatus described above in items 1 to 12;
a recognition unit configured to recognize a surrounding environment based on a partial image acquired by the correction unit and corrected in distortion; and
a control unit configured to perform control for driving assistance or automated driving based on a surrounding environment recognized by the recognition unit.

According to this embodiment, there is provided a vehicle control apparatus that achieves control of more rapid and appropriate driving assistance and automated driving in response to detection of a road mirror.

14. Also, the above embodiments discloses an image processing method for performing external recognition for driving assistance or automated driving of a vehicle based on a captured image obtained from a photographing apparatus configured to capture an image requiring distortion correction, the image processing method comprising:
moving and setting a partial region to be a target of distortion correction processing according to a rule, and applying the distortion correction processing to the set partial region of the captured image to acquire a partial image corrected in distortion;

detecting a road mirror around the vehicle; and changing the rule so that a partial region corresponding to a predetermined direction of the vehicle is preferentially set as a target of the distortion correction processing when a road mirror is detected by the detecting.

According to the above embodiment, since the image of the partial region corresponding to the direction to be closely watched corresponding to the detection of the road mirror is preferentially acquired, the object can be detected with high frequency and high accuracy in the direction to be closely watched suitable for the road situation. Therefore, appropriate control can be performed in the driving assistance control and the automated driving control.

15. Further, the above embodiments disclose a program for causing a computer to function as each unit of the above-mentioned image processing apparatus or vehicle control apparatus, and a storage medium containing the program.

For example, the program is executed by the ECU included in the vehicle control apparatus, whereby an image of a partial region corresponding to the direction to be closely watched corresponding to the detection of the road mirror is preferentially acquired, and the object can be detected with high frequency and high accuracy in the direction to be closely watched suitable for the road situation.

The invention is not limited to the foregoing embodiments, and various variations/changes are possible within the spirit of the invention.

What is claimed is:

1. An image processing apparatus configured to perform external recognition for driving assistance or automated driving of a vehicle based on a captured image obtained from a photographing apparatus configured to capture an image requiring distortion correction, the image processing apparatus comprising:
at least one processor circuit with a memory comprising instructions that, when executed by the at least one processor circuit, cause the at least one processor circuit to at least:
move and set a partial region to be a target of distortion correction processing according to a rule, and to apply the distortion correction processing to the set partial region of the captured image to acquire a partial image corrected in distortion;
detect a mirror around the vehicle; and
change the rule to increase a frequency of performing the distortion correction for a partial region corresponding to a predetermined direction of the vehicle when a mirror is detected.

2. The image processing apparatus according to claim 1, wherein the instructions, when executed by the at least one processor circuit, further cause the at least one processor circuit to at least detect the mirror based on an image of a partial region subjected to distortion correction.

3. The image processing apparatus according to claim 1, wherein the instructions, when executed by the at least one processor circuit, further cause the at least one processor circuit to at least detect the mirror based on an image captured by a photographing apparatus configured to capture an image not to be a target of distortion correction.

4. The image processing apparatus according to claim 1, wherein the instructions, when executed by the at least one processor circuit, further cause the at least one processor circuit to at least change the rule to increase the frequency of performing the distortion correction processing for at least one partial region corresponding to at least one of a left front side and a right front side of the vehicle.

5. The image processing apparatus according to claim 1, wherein a photographing apparatus configured to capture an image requiring the distortion correction is a fisheye camera.

6. The image processing apparatus according to claim 1, wherein the image processing apparatus is connected to a plurality of photographing apparatuses, the plurality of photographing apparatuses being arranged to capture an entire periphery of the vehicle and configured to capture an image requiring the distortion correction, and
wherein the rule is changed for a photographing apparatus including the predetermined direction in a shooting range among the plurality of photographing apparatuses.

7. An image processing apparatus configured to perform external recognition for driving assistance or automated driving of a vehicle based on a captured image obtained from a photographing apparatus configured to capture an image requiring distortion correction, the image processing apparatus comprising:
at least one processor circuit with a memory comprising instructions that, when executed by the at least one processor circuit, cause the at least one processor circuit to at least:
move and set a partial region to be a target of distortion correction processing according to a rule, and to apply the distortion correction processing to the set partial region of the captured image to acquire a partial image corrected in distortion;
detect a mirror around the vehicle; and
change the rule so that a partial region corresponding to a predetermined direction of the vehicle is preferentially set as a target of the distortion correction processing when a mirror is detected,
wherein a direction in which a further detected mirror reflects is detected, and
wherein the rule to increase a frequency of performing the distortion correction processing is changed for a partial region corresponding to a direction in which the detected mirror reflects.

8. The image processing apparatus according to claim 7, wherein the instructions, when executed by the at least one processor circuit, further cause the at least one processor circuit to at least detect a direction in which a mirror reflects based on whether a position where a mirror is present is on a left or right side of a center of a lane in which a vehicle travels.

9. The image processing apparatus according to claim 7, wherein the instructions, when executed by the at least one processor circuit, further cause the at least one processor circuit to at least detect a direction in which a mirror reflects based on a positional relationship between an ellipse corresponding to a mirror surface of a mirror and a support column configured to support the mirror surface.

10. An image processing apparatus configured to perform external recognition for driving assistance or automated driving of a vehicle based on a captured image obtained from a photographing apparatus configured to capture an image requiring distortion correction, the image processing apparatus comprising:
at least one processor circuit with a memory comprising instructions that, when executed by the at least one processor circuit, cause the at least one processor circuit to at least:

move and set a partial region to be a target of distortion correction processing according to a rule, and to apply the distortion correction processing to the set partial region of the captured image to acquire a partial image corrected in distortion;

detect a mirror around the vehicle; and change the rule so that a partial region corresponding to a predetermined direction of the vehicle is preferentially set as a target of the distortion correction processing when a mirror is detected, wherein an unchanged rule is a rule indicating an order of selecting a partial region on a one-by-one basis from a plurality of partial regions, the respective partial regions set in advance and having different positions, and wherein the rule is changed to select at least one of the plurality of partial regions corresponding to the predetermined direction more frequently than other ones of the plurality of partial regions.

11. An image processing apparatus configured to perform external recognition for driving assistance or automated driving of a vehicle based on a captured image obtained from a photographing apparatus configured to capture an image requiring distortion correction, the image processing apparatus comprising:

at least one processor circuit with a memory comprising instructions that, when executed by the at least one processor circuit, cause the at least one processor circuit to at least:

move and set a partial region to be a target of distortion correction processing according to a rule, and to apply the distortion correction processing to the set partial region of the captured image to acquire a partial image corrected in distortion;

detect a mirror around the vehicle; and change the rule so that a partial region corresponding to a predetermined direction of the vehicle is preferentially set as a target of the distortion correction processing when a mirror is detected, wherein an order is maintained of selecting a partial region on a one-by-one basis from a plurality of partial regions, the respective partial regions set in advance and having different positions, and the instructions, when executed by the at least one processor circuit further cause the at least one processor circuit to select at least one of the plurality of partial regions corresponding to the predetermined direction more frequently than other ones in a group of partial regions including one of the partial regions corresponding to the predetermined direction and different from any of the other ones of the plurality of partial regions.

12. The image processing apparatus according to claim 11, wherein a group of the partial regions is configured by adding a partial region corresponding to the predetermined direction and different from any of the plurality of partial regions to the plurality of partial regions, or by substituting any one of the plurality of partial regions with the different partial region.

13. A vehicle control apparatus comprising:

an image processing apparatus configured to perform external recognition for driving assistance or automated driving of a vehicle based on a captured image obtained from a photographing apparatus configured to capture an image requiring distortion correction, the image processing apparatus including at least one processor circuit with a memory comprising instructions that, when executed by the at least one processor circuit, cause the at least one processor circuit to at least:

move and set a partial region to be a target of distortion correction processing according to a rule, and to apply the distortion correction processing to the set partial region of the captured image to acquire a partial image corrected in distortion, detect a mirror around the vehicle, and change the rule to increase a frequency of performing the distortion correction for a partial region corresponding to a predetermined direction of the vehicle when a mirror is detected;

recognize a surrounding environment based on a partial image acquired and corrected in distortion; and control for driving assistance or automated driving based on the surrounding environment recognized.

14. An image processing method for performing external recognition for driving assistance or automated driving of a vehicle based on a captured image obtained from a photographing apparatus configured to capture an image requiring distortion correction, the image processing method comprising:

moving and setting a partial region to be a target of distortion correction processing according to a rule, and applying the distortion correction processing to the set partial region of the captured image to acquire a partial image corrected in distortion;

detecting a mirror around the vehicle; and changing the rule to increase a frequency of performing the distortion correction for a partial region corresponding to a predetermined direction of the vehicle when a mirror is detected by the detecting.

15. A non-transitory computer-readable storage medium storing a program for causing a computer to execute an image processing method for performing external recognition for driving assistance or automated driving of a vehicle based on a captured image obtained from a photographing apparatus configured to capture an image requiring distortion correction, the method comprising:

moving and setting a partial region to be a target of distortion correction processing according to a rule, and applying the distortion correction processing to the set partial region of the captured image to acquire a partial image corrected in distortion;

detecting a mirror around the vehicle; and changing the rule to increase a frequency of performing the distortion correction for a partial region corresponding to a predetermined direction of the vehicle when a mirror is detected by the detecting.

* * * * *